June 11, 1935. J. R. SNYDER 2,004,299
UNIVERSAL JOINT
Filed Jan. 23, 1933
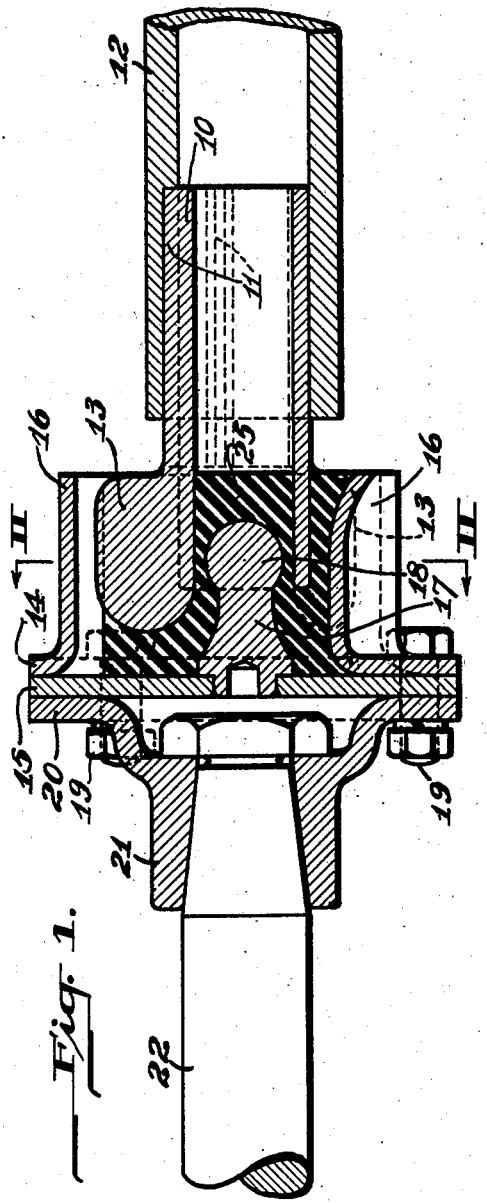
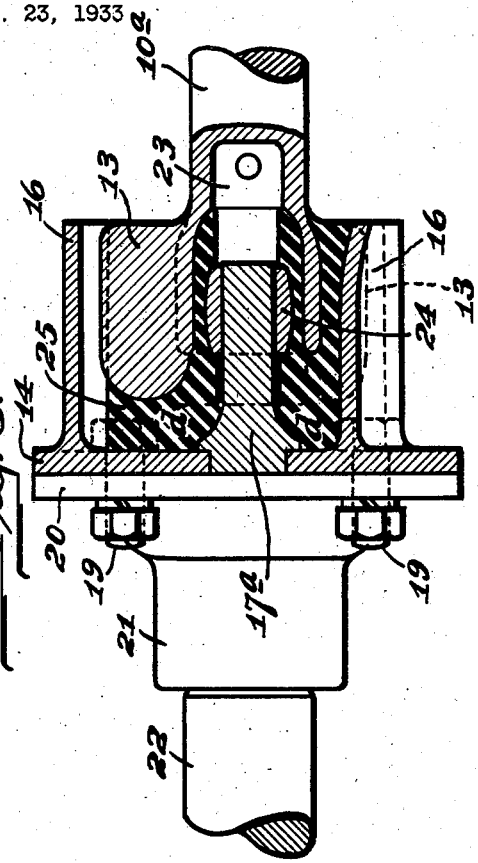
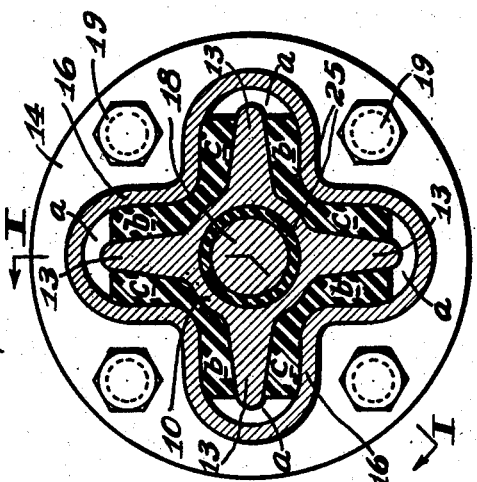
WITNESSES
A.B.Wallace.
E. O. Johns
INVENTOR
Jacob Rush Snyder
By
Brown, Critchlow & Flick
his Attorneys.

Patented June 11, 1935

2,004,299

UNITED STATES PATENT OFFICE 2,004,299

UNIVERSAL JOINT

Jacob Rush Snyder, Pittsburgh, Pa.

Application January 23, 1933, Serial No. 652,993

8 Claims. (Cl. 64—96)

My invention pertains in general to universal joints, and more particularly to universal joints for employment in connection with the propeller shafts of automobiles and the like. It is an object of my invention to provide such a joint in which the metallic parts may be made of material of relatively low cost, avoiding the expense of the special alloy steels now generally used thereon, in which there will be no necessity for the various hardening, grinding and other operations which heighten the cost of such joints as now usually manufactured, and which, therefore, can be produced with great economy. It is another object of my invention to provide a universal joint which will absorb the shocks which would otherwise be imparted by one member thereof to the other. Other objects will appear from the following specification and claims.

A universal joint constructed in accordance with my invention, together with a modified form thereof, is described by way of example in the following specification and shown in the accompanying drawing. It is to be understood, however, that the invention may be embodied in other forms, and that changes may be made in the forms described and shown without exceeding the scope thereof, as defined in the claims.

In the drawing, Fig. 1 is a sectional view showing a universal joint embodying my invention, the section being taken on the line I—I of Fig. 2;

Fig. 2 is a cross-section of the same, the section being taken on the line II—II of Fig. 1; and Fig. 3 is a view similar to Fig. 1, but showing a modified form of the joint.

Referring now to Figs. 1 and 2, 10 designates one of the shafts, which may be the driving shaft and which may be provided with key projections 11 splined into the corresponding grooves of a tubular continuation shaft 12. The shaft 10 is hollow, and is formed at its end with a driving spider consisting of a plurality of wings 13. These wings are preferably three or more in number, four of them being shown.

Surrounding the driving spider is a cage comprising a flange 14 secured to an end plate 15, as by welding, and having extending therefrom a plurality of U-shaped portions 16. These portions correspond in shape and number with the wings 13 of the driving spider, and are of such dimensions as to leave space for the reception of rubber between their inner walls and the faces of the wings 13, as well as between the end plate 15 and the ends of the wings 13. Thus one-half of each U portion and the opposite half of the adjacent U portion constitute, in effect, an arm disposed between a pair of wings of the spider. Centrally from the end plate 15 there extends a centralizing member 17 having at its ends a spherical portion 18. This centralizing member is of such length that when the cage is assembled upon the driving spider the spherical portion 18 becomes located within the open end of the tubular shaft 10. To the end plate 15 is secured, by bolts or the like 19, the flange 20 of the coupling 21 of the other shaft, 22, of the joint, which shaft may be the driven shaft.

The interior space between the U-portions 16 of the cage and the wings 13 of the spider, and between the extremities of the spider and the end plate 15, are filled with rubber 25, which is made to adhere, by one of the metal and rubber bonding processes now well known, to the spider, cage and centralizing member. Spaces $a$ are left, however, at the radially outward ends of the U-portions of the cage, so as to provide room for the expansion of such portions of the rubber as are put under compression. Rubber showing a durometer hardness of 55 may be employed, though this degree of hardness may be considerably varied.

The rubber connection between the driving and driven members efficiently fulfills all driving requirements, and at the same time, through the flexibility of the rubber, permits of variations in the inclination of one shaft with respect to the other. The bonding of the rubber to the metal, as accomplished by present-day processes, is so secure that there is no danger of separation. Considering the shaft 10 to be the driving shaft, and to rotate clockwise, as seen in Fig. 2, the portions of rubber at $b$ will be under compression, while the portions of rubber at $c$ will be under tension. With rubber of a durometer hardness of 55, about 75% of the torque load will be taken up in compressing the portions $b$, while about 25% will be taken up in stretching the portions $c$, and it is found that the rubber is capable, with an abundant factor of safety, of withstanding any loads which will be imparted thereto under any conditions that can be encountered in the use of the device. This is the case even though the joint may become heated, as, for instance, because of continued vibration of the parts of the coupling with respect to each other due to the running of an automobile over rough roads and with constant variations of the application of power. The centralizing member always maintains the two parts of the coupling in their correct axial relation with respect to each other.

In the coupling described with reference to Figs. 1 and 2, the driving shaft 10 is splined to the tubular continuation shaft 12, to make the necessary provision for endwise movement between the driving and driven shafts. In some circumstances, especially where the design of the remainder of the machinery is such that longitudinal movement between the driving and driven members will be small, I propose to dispense with the splined construction, which is expensive and requires lubrication. To this end, in the modified form of my universal joint shown in Fig. 3, a solid shaft 10a replaces the splined shaft 10 and continuation shaft 12, being provided with a cavity 23 at its outer end and with a driving spider similar to that described in connection with the preceding embodiment. The cage, with its U-shaped portions 16, is likewise similar to that shown in Fig. 2, except that in this modified form the centralizing member 17a is of cylindrical material and has slidably mounted thereon a ring 24, the outer part of which, while not spherical, is shaped towards the spherical. The centralizing member and ring are made of one or another of the oilless non-friction materials now commonly available on the market. The centralizing member is chromium plated from the line d—d to its extremity, or otherwise so treated that the rubber will not adhere thereto, this being indicated, for purposes of clearness, in Fig. 3, by the showing of a small space between the rubber and the centralizing member from the line d—d to the end of the ring 24, although such space might not actually occur in practice. Except for the portion just noted, the rubber 25 is bonded to the metallic portions of the joint in the manner that has been described in connection with Figs. 1 and 2, being also bonded to the outer surface of the ring 24. It will be noted that this construction safely permits longitudinal movement between the two members of the coupling in spite of the narrow section of rubber which surrounds the ring 24.

The coupling of my invention is exceedingly economical of manufacture, presenting no requirement for expensive special alloy materials and requiring no hardening, grinding, special fitting operations or the like. It can be manufactured at greatly reduced expense as compared with universal joints in use today. At the same time it is highly efficient, and entirely safe in use. An additional advantage, of considerable importance, is that the joint exercises a shock-absorbing function between the driving and driven members, giving, for instance, materially added comfort in the operation of an automobile because of the cushioned drive.

I claim:

1. A universal joint comprising a member having portions extending substantially radially therefrom and formed with an axial cavity, a second member having substantially radial portions constructed to extend between the radial portions of said first-named member and having an axial centralizing portion constructed to extend into the cavity of said first-named member, and a one-piece rubber filling disposed between the radial portions of said members and in the cavity of said first-named member between said centralizing portion and the radially extending portions of said members where it encircles the centralizing portion and spaces it from said first-named member.

2. A universal joint comprising a member having portions extending substantially radially therefrom and formed with an axial cavity, a second member having substantially radial portions constructed to extend between the radial portions of said first-named member and having an axial centralizing portion constructed to extend into the cavity of said first-named member, and a yielding filling disposed in the cavity of said first-named member to surround said centralizing portion and hold it out of contact with said first-named member, said filling also being disposed between and attached to the radial portions of said members, whereby torque applied to said driving member is imparted to said driven member through compression of said filling on one side of said radial portions and tension of said filling on the other side of said portions.

3. A universal joint comprising a member having portions extending substantially radially therefrom and formed with an axial cavity, a second member having substantially radial portions constructed to extend between the radial portions of said first-named member, a centralizing member carried by said second-named member and extending within the cavity of said first-named member, a bearing member slidably associated with said centralizing member, and a rubber filling disposed between the radial portions of said members and in the cavity of said first-named member to completely embrace said bearing member, said filling being bonded to said radial portions.

4. A universal joint comprising a member having portions extending substantially radially therefrom and formed with an axial cavity, a second member having substantially radial portions constructed to extend between the radial portions of said first-named member, a centralizing member carried by said second-named member and extending within the cavity of said first-named member, a bearing member slidably associated with said centralizing member, and a rubber filling disposed between the radial portions of said members and in the cavity of said first-named member to embrace said bearing member, said filling being attached to said radial portions and to said bearing member, but free of said centralizing member at the part thereof adjacent said bearing member.

5. A universal joint comprising a metallic member provided with a plurality of arms extending substantially radially thereof, a second metallic member provided with arms extending substantially radially thereof, and disposed between the arms of said first-named member, a centralizing member extending from one of said members and entering the other member axially, and a rubber body embracing and bonded to said centralizing member, said body having portions disposed between the arms of one member and those of the other member and bonded to said arms.

6. A universal joint comprising a metallic member provided with a plurality of arms extending substantially radially thereof, a second metallic member, a cage secured to said second member, said cage having U-shaped portions for embracing in a circumferential direction the arms of said first-named member and having an end wall spaced longitudinally from said arms, a centralizing member projecting from said cage to enter said first-named member axially, and a filling of rubber disposed in said cage and bonded thereto and to said arms and centralizing members, said rubber filling also occupying the space between said end wall and said arms.

7. A universal joint comprising a member having portions extending substantially radially therefrom and formed with an axial cavity, a second member having substantially radial portions constructed to extend between the radial portions of said first-named member and having an axial centralizing portion constructed to extend into the cavity of said first-named member, and a rubber filling disposed in the cavity of said first-named member to surround said centralizing portion, said filling also being disposed between the radial portions of said members, and all surfaces of the filling being bonded to the members which they engage whereby abrasion between the filling and said members is prevented.

8. A universal joint comprising a driving member, a driven member, a centering member, and a single piece of rubber spacing all of said members apart and bonded to each of them to form a unitary flexible joint.

JACOB RUSH SNYDER.